July 5, 1938.  J. H. LAMONT  2,122,616

PIPE COUPLING DEVICE

Filed Sept. 29, 1937  2 Sheets-Sheet 1

Inventor
James Hunter Lamont
By Williams, Bradbury,
McCaleb & Hinkle
Atty

July 5, 1938.  J. H. LAMONT  2,122,616

PIPE COUPLING DEVICE

Filed Sept. 29, 1937  2 Sheets-Sheet 2

Inventor
James Hunter Lamont
By Williams, Bradbury,
McColl & Hinkle Attys.

Patented July 5, 1938

2,122,616

UNITED STATES PATENT OFFICE 2,122,616

PIPE COUPLING DEVICE

James Hunter Lamont, Edinburgh, Scotland, assignor to James H. Lamont & Company, Limited, Edinburgh, Scotland Application September 29, 1937, Serial No. 166,272

2 Claims. (Cl. 285—79)

This invention relates to a pipe coupling device for joining a pipe of comparatively ductile metal such as copper to a tubular connecting piece, which may be another pipe or a metal fitting such as a metal union or an angle connection, or a bend, elbow, tee-piece or cross-piece.

In the specification of my prior Patent No. 1,920,512 I have described a fluid-tight pipe joint or coupling capable of fulfilling the above-mentioned requirements and employing a gripping member having a plurality of prongs or a split collet adapted to be contracted upon the pipe end into gripping engagement therewith by the cooperation of the gripping member or split collet with a coupling member or coupling nut.

While the said pipe coupling has been found to be suited to most commercial requirements, the provision of the prongs on the gripping member or the splitting of the collet imparts such a resilience to the said member or collet that it may in some cases yield upon the pipe under exceptional internal expanding forces, such as when the pipe is subjected to high tensile stresses which may tend to pull the pipe out of the joint, as for instance when the pipe is subjected to extremely cold conditions or is used in refrigerating plants. In such cases there is the possibility that the gripping member or split collet may yield sufficiently to permit the pipe to be pulled out of the joint or coupling. Moreover, the formation of the prongs on the gripping member or the splitting of the collet involves the operation of saw-cutting the gripping member or collet, thereby increasing the cost of production.

My invention has for its object to provide a pipe joint or coupling device which, while possessing the general characteristics and all the advantages of the coupling described in my aforesaid prior patent, will withstand high tensile stresses such as arise in refrigeration work and I am thus enabled to produce a fluid-tight metal-to-metal joint between any tubular connecting piece and a pipe of comparatively ductile metal such as copper, the joint being characterized by its ability to resist any tendency of the pipe to pull out of the joint under high tensile stresses. Furthermore, I am enabled to reduce the cost of manufacturing the coupling device by eliminating the operation of saw-cutting the gripping member or collet.

In the pipe joint or coupling described in my aforesaid prior patent a double-tapered hollow plug or a spigot is interposed between the pipe end and the piece to which it is to be connected, which necessitates either boring out the connecting piece to receive one end of the double-tapered plug or the provision of a connecting piece having a tapered spigot formed thereon. It is a further object of my present invention to provide a pipe joint or coupling device which, besides having the characteristics set out in the immediately preceding paragraph, will have the added advantage that any copper or other comparatively ductile metal pipe can be connected to any fitting which has not been made with a tapered spigot or which has not been bored out to receive one end of a double-tapered hollow plug. Consequently, my improved coupling device can be used to connect copper pipes to any existing fittings.

According to the present invention a solid or unsplit metal sleeve is pressed on to the preformed flared end of the copper or other comparatively ductile metal pipe end so as to be in fluid-tight permanent connection therewith and to this end the metal sleeve is formed with an unsplit tapered portion which is compressed on to the pipe by the cooperation of the unsplit tapered portion of the sleeve with a correspondingly tapered aperture in an inturned flange formed on the coupling member or coupling nut at the back thereof, and the said coupling member or coupling nut loosely receives an enlarged cylindrical portion of the sleeve. The coupling device may be used with a tapered spigot or with a double-tapered hollow plug inserted into the flared pipe end as described in my aforesaid prior patent, or the said spigot or plug may be replaced by a deformable washer inserted between the sleeve on the flared pipe end and an abrupt end face on the piece to which the pipe is to be connected. The improved coupling device can thus be used with or without the hollow plug or spigot. Alternatively, a hollow spigot inserted in the pipe end may be combined with a deformable washer adapted to seal the joint between the pipe end and an abrupt end face on the piece to which the pipe is to be connected.

According to a further form of my invention a solid or unsplit metal sleeve has one end formed as an unsplit externally tapered portion adapted to be compressed on to the pipe by cooperating with a correspondingly tapered aperture in an inturned flange formed on the coupling member or coupling nut, an enlarged cylindrical portion, intermediate the ends of the sleeve, adapted to be loosely received in the coupling member or coupling nut, and a spigot at the other end of the sleeve, tapered externally towards its end to fit a suitable bore in the piece to which the pipe is to be connected; the spigot has an inwardly tapering bore adapted to closely fit upon the flared end of the pipe. In this case therefore the sleeve and spigot are unitary and integral with one another and the coupling device can be employed for connecting a pipe to any tubular piece having a bore which will fit the external taper of the spigot on the sleeve.

In order that the invention may be more clearly understood, reference is hereinafter made to the accompanying drawings whereon Fig. 1 is a view half in section and half in side view showing my improved coupling device employed with a double-tapered hollow plug. Fig. 2 is a view of the parts shown in Fig. 1 when separated from one another after the joint has been made. Fig. 3 is a sectional view showing my improved coupling device employed with a deformable washer.

Figure 1:
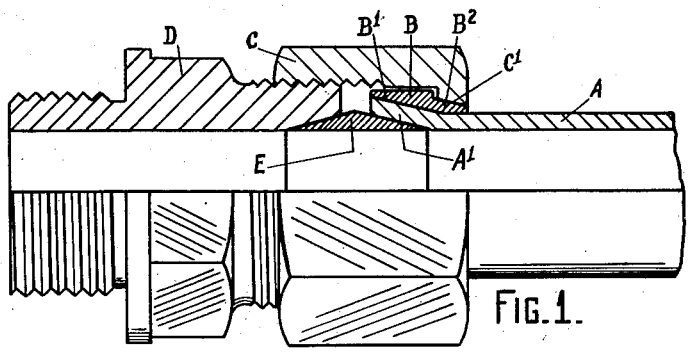
Figure 2:
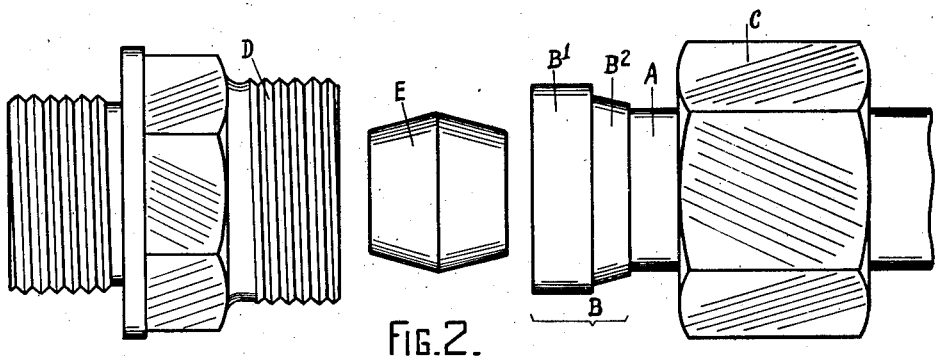

Referring firstly to Figs. 1 and 2, the pipe A is first expanded to provide the pre-formed flared end A¹. Upon the pipe is fitted a solid or unsplit deformable metal sleeve B, preferably of brass, which is previously bored to closely fit the outside of the flared end of the pipe. The sleeve B has an externally cylindrical portion B¹ and a reduced externally tapered portion B². Upon the pipe and behind the sleeve B is fitted a coupling nut C which fits loosely over the cylindrical portion B¹ of the sleeve. The nut C has an inturned flange C¹ at the back formed with a tapered aperture to closely fit the tapered portion B² of the sleeve. The part D to which the pipe is to be connected is externally screw-threaded to receive the coupling nut C and is bored with a taper to receive one tapered end of the double-tapered hollow plug E, the other tapered end of which is fitted into the flared pipe end.

When the nut C is screwed upon the part D, the nut C draws the sleeve on to the flared end of the pipe, which is compressed tightly between the sleeve B and the plug E. Tightening up of the nut C causes the tapered aperture in the flange C¹ to contract the tapered portion B² of the sleeve upon the pipe into tight gripping engagement therewith. The sleeve B is thus permanently secured to the end of the pipe and a fluid-tight union is effected between the sleeve and the pipe. The tapered portion B² of the sleeve is so firmly contracted upon the pipe and is of such an unyielding nature that the pipe cannot be drawn out of the sleeve B even under the high tensile stresses which arise under abnormally low temperature conditions.

It will be understood of course that the coupling device shown in Figs. 1 and 2 may be used for coupling two copper pipes together as in Figs. 1 and 2 of my prior patent or for coupling a pipe to a spigoted part as in Fig. 11 of my prior patent.

Figure 3:
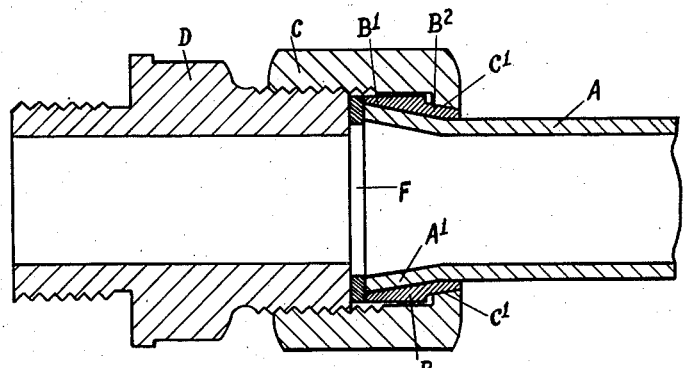

Referring now to Fig. 3 of the accompanying drawings, the sleeve B is there shown as abutting against a deformable metal washer F which bears against an abrupt face on the part D. In this case, the screwing of the nut C upon the part D compresses the washer F between the sleeve B and part D to effect a fluid-tight joint between them, in addition to compressing the tapered sleeve portion B² upon the pipe as already described with reference to Figs. 1 and 2. As the pipe end is expanded, it can be used either with or without the plug E according to the construction of the part to which the pipe is to be connected.

Figure 4:
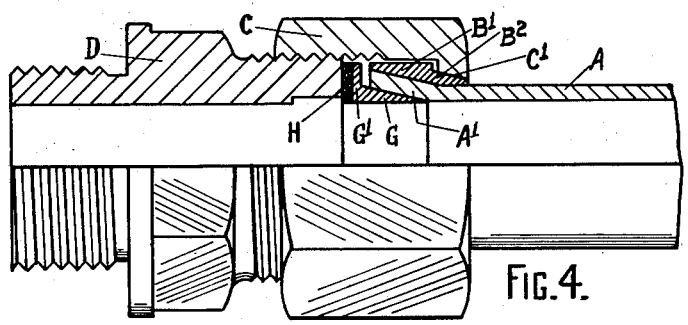
Figs. 4 and 5 are views similar to Figs. 1 and 2 showing my improved coupling device employing a combined washer and hollow spigot.
Figure 5:
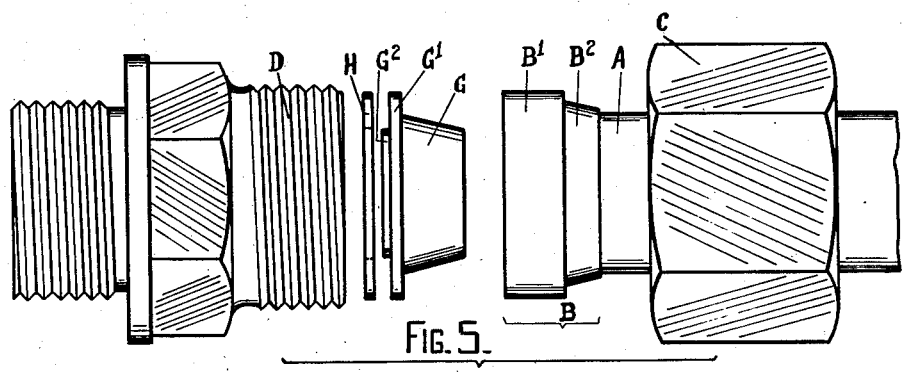

Figs. 4 and 5 illustrate a modification in which a hollow tapered metal spigot or thimble G fits into the flared pipe end and has a flange G¹ and a cylindrical end portion G². A fibre or other compressible washer H is fitted on the end portion G² and bears against the flange G¹. When the coupling nut C is screwed upon the part D, the washer H abuts against an abrupt end face on the part D and forces the thimble G into the flared pipe end. At the same time, the tapered aperture in the flange C¹ of the nut contracts the tapered portion B² of the sleeve upon the pipe as already described with reference to Figs. 1 and 2. The constructions shown in Figs. 3, 4, and 5 can thus be used for connecting a copper or like pipe to any metal fitting D which is not bored to receive one end of a double tapered plug such as E in Fig. 2.

Figure 6:
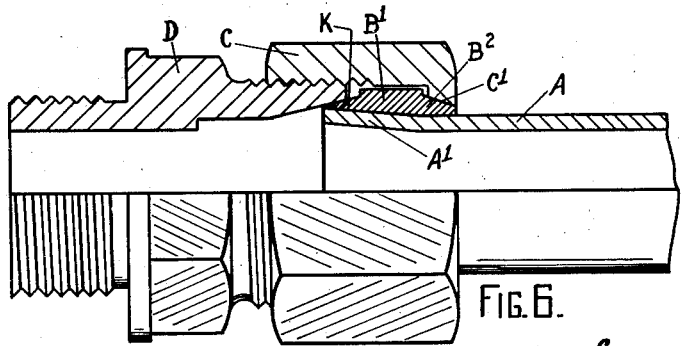
Figs. 6 and 7 are views similar to Figs. 1 and 2 showing the coupling device with a unitary sleeve and spigot.
Figure 7:
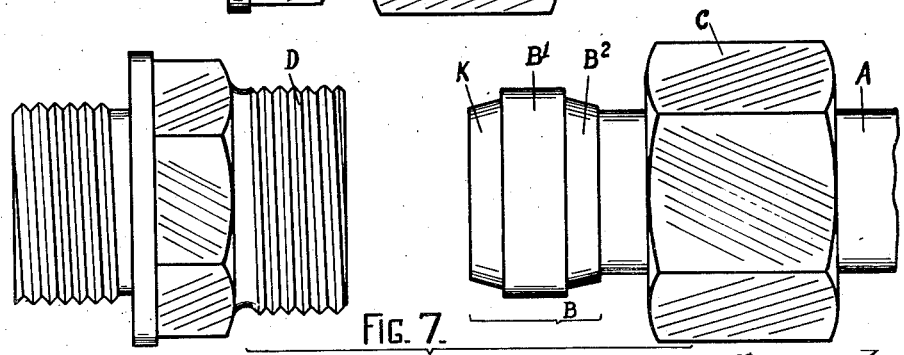

Figs. 6 and 7 illustrate a coupling device in which the solid or unsplit sleeve B having the cylindrical portion B¹ and tapered portion B² as in Figs. 1–5, is integral and unitary with a spigot K formed with an inwardly tapering bore to fit upon the pre-formed flare on the pipe-end. The spigot K is tapered externally in the opposite direction to the taper of the portion B². In this case, the combined sleeve B and spigot K is adapted for connecting the flared pipe end to any metal fitting D which has a bore sufficiently large to fit the external taper of the spigot K. The bore in the end of the metal fitting D may be either a parallel or tapered bore. When the nut C is screwed upon the metal fitting D, the nut C draws the sleeve B over the pipe A until the spigot K closely fits the flared end of the pipe and until the spigot K is forced into the bore in the end of the metal fitting D. At the same time the aperture in the flange C¹ of the nut C compresses the tapered portion B² of the sleeve into tight gripping engagement with the pipe A as already described with reference to Figs. 1–5. The coupling device illustrated in Figs. 6 and 7 may be used for coupling together two copper pipes of unequal size, in which case the combined sleeve B and spigot K would be fitted to the smaller pipe and the spigot K would fit into a flared end on the larger pipe, the latter being fitted with a coupling member internally tapered to fit the flared end of the larger pipe and externally screw-threaded to screw into the coupling nut C on the smaller pipe.

In any of the constructions illustrated in the drawings, the coupling nut C and the screw-threaded metal fitting D may be replaced by flanged coupling members bolted together as illustrated in Fig. 3 of my prior patent.

In all cases the pipe end must be expanded or flared sufficiently to ensure that the pipe when gripped by the tapered portion B² of the sleeve cannot be drawn out of the sleeve.

I claim:

1. A pipe coupling device for comparatively ductile metal pipe such as copper or the like, comprising a metal sleeve having adjacent one end an internal surface tapered to fit a corresponding preformed flare on the end of a pipe to be coupled, said end of the sleeve having a circumferentially continuous cylindrical surface, the other end of said sleeve having a circumferentially continuous internal surface adapted to fit snugly about a portion of said pipe and a circumferentially continuous tapered external surface, the larger end of said last named tapered surface being adjacent said cylindrical surface, and a hollow coupling member having a portion adapted loosely to receive the cylindrical portion of the sleeve and having a tapered internal surface adapted to fit the externally tapered portion of the sleeve, said coupling member being arranged to cooperate with a complementary element to draw said sleeve upon the preformed flare of the pipe thereby causing the tapered internal surface of the coupling member to compress the portion of the sleeve having the external taper whereby said last named portion of the sleeve is forced into permanent fluid-tight gripping engagement with the pipe at a zone spaced from the end of the pipe.

2. A pipe coupling device for comparatively ductile metal pipe such as copper or the like, comprising a metal sleeve having adjacent one end an internal surface tapered to fit a corresponding preformed flare on the end of a pipe to be coupled, said end of the sleeve having a circumferentially continuous cylindrical surface, the other end of said sleeve having a circumferentially continuous internal surface adapted to fit snugly about a portion of said pipe and a circumferentially continuous tapered external surface, the larger end of said last named tapered surface being adjacent said cylindrical surface, a hollow coupling member having a portion adapted loosely to receive the cylindrical portion of the sleeve and having a tapered internal surface adapted to fit the externally tapered portion of the sleeve, a complementary coupling element having an abrupt end face, said coupling member being arranged to cooperate with said complementary element to draw said sleeve upon the preformed flare of the pipe thereby causing the tapered internal surface of the coupling member to compress the portion of the sleeve having the external taper whereby said last named portion of the sleeve is forced into permanent fluid-tight gripping engagement with the pipe at a zone spaced from the end of the pipe, a hollow tapered metal thimble adapted to fit into the flared pipe end and having a flange at its wider end, and a compressible washer adapted to fit between the flange on the thimble and the abrupt end face presented by the coupling element in order to seal the joint between the flared pipe end and said abrupt end face.

JAMES HUNTER LAMONT.